US012643603B2

(12) United States Patent
    Gaydos et al.

(10) Patent No.: US 12,643,603 B2
(45) Date of Patent: Jun. 2, 2026

(54) STEERING RACK TRAVEL CONTROL FOR MISALIGNMENT COMPENSATION

(71) Applicant: GM Global Technology Operations LLC, Detroit, MI (US)

(72) Inventors: Jason W. Gaydos, Waterford, MI (US); Raed Nasim Abuaita, Fenton, MI (US); Ibrahim A. Badiru, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 57 days.

(21) Appl. No.: 18/912,786

(22) Filed: Oct. 11, 2024

(65) Prior Publication Data

US 2026/0103238 A1 Apr. 16, 2026

(51) Int. Cl.
    *B62D 7/15* (2006.01)
    *B62D 7/14* (2006.01)
(52) U.S. Cl.
    CPC ............. *B62D 7/159* (2013.01); *B62D 7/148* (2013.01); *B62D 7/1581* (2013.01)
(58) Field of Classification Search
    CPC ....... B62D 7/159; B62D 7/148; B62D 7/1581
    USPC ........................................ 701/41, 42, 43, 44
    See application file for complete search history.

(56) References Cited

U.S. PATENT DOCUMENTS

| | | |
|---|---|---|
| 7,698,031 B2 | 4/2010 | Stevenson |
| 2018/0158260 A1 | 6/2018 | Dudar |

OTHER PUBLICATIONS

German Office Action for German Application No. 102024135751.7; dated Jun. 25, 2025; 3 pages.

*Primary Examiner* — Hai H Huynh
(74) *Attorney, Agent, or Firm* — CANTOR COLBURN LLP

(57) ABSTRACT

A system performs a method for operating a vehicle. The system includes a first steering system for a first axle of the vehicle and a processor. The processor determines the first axle to have a misaligned wheel thereon, applies a non-zero steering wheel angle to a steering wheel of the vehicle to maintain the vehicle moving straight with the misaligned wheel, measures a value of the non-zero steering wheel angle, determines a misalignment angle of the misaligned wheel from the value of the non-zero steering wheel angle, determines a reduced travel range for the first axle from a first nominal travel range of the first axle and the misalignment angle and activates the first steering system to steer the vehicle by limiting the movement of the first axle using the reduced travel range. The reduced travel range allows the misaligned wheel to move without contacting the vehicle.

20 Claims, 9 Drawing Sheets

1100

1200

STEERING RACK TRAVEL CONTROL FOR MISALIGNMENT COMPENSATION

The subject disclosure relates to operating a vehicle having a misaligned wheel and, in particular, to a system and method for controlling steering rack travel ranges on axles of the vehicle to compensate for the misaligned wheel.

Standard operation of a vehicle or steering of a vehicle assumes that the wheels of the vehicle are properly aligned. There are times, however, that a wheel becomes misaligned. This misalignment can cause difficulty in steering as well as other issues. For example, during a turn, a properly aligned wheel does not make contact with an interior wall of a wheel cavity, while a misaligned wheel can make contact. Accordingly, it is desirable to provide a method of identifying a misaligned wheel and compensating steering ranges to prevent the misaligned wheel from making contact with the vehicle.

SUMMARY

In one exemplary embodiment, a method of operating a vehicle is disclosed. A first axle having a misaligned wheel thereon is determined. A non-zero steering wheel angle is applied to a steering wheel of the vehicle to maintain the vehicle moving straight with respect to a longitudinal axis of the vehicle with the misaligned wheel. A value of the non-zero steering wheel angle that maintains the vehicle moving straight is measured. A misalignment angle of the misaligned wheel is determined from the value of the non-zero steering wheel angle. A reduced travel range for the first axle is determined from a first nominal travel range of the first axle and the misalignment angle, wherein the reduced travel range allows for a movement of the misaligned wheel without contacting the vehicle. The vehicle is steered by limiting the movement of the first axle using the reduced travel range.

In addition to one or more of the features described herein, the method further includes limiting the movement of the first axle using the first nominal travel range when the misaligned wheel does not make contact with the vehicle at any location of the first axle within the first nominal travel range.

In addition to one or more of the features described herein, the method further includes determining an extended travel range for a second axle of the vehicle based on the misalignment angle of the misaligned wheel on the first axle and steering the vehicle by limiting the movement of the second axle using the extended travel range, wherein the extended travel range is greater than a second nominal travel range of the second axle.

In addition to one or more of the features described herein, limiting the movement of the first axle using the reduced travel range and limiting the movement of the second axle using the extended travel range allows the vehicle to achieve a desired turning radius.

In addition to one or more of the features described herein, one of the first axle is a front axle of the vehicle and the second axle is a rear axle of the vehicle and the first axle is the rear axle of the vehicle and the second axle is the front axle.

In addition to one or more of the features described herein, applying the non-zero steering wheel angle to maintain the vehicle moving straight further includes applying the steering wheel angle only at the front axle of the vehicle with the rear axle in a neutral position.

In addition to one or more of the features described herein, the method further includes determining the misalignment angle based on the non-zero steering wheel angle that maintains the vehicle moving straight and a multiplicative constant dependent on whether the first axle is a front axle or a rear axle.

In another exemplary embodiment, a system for operating a vehicle is disclosed. The system includes a first steering system for a first axle of the vehicle and a processor. The processor is configured to determine the first axle to have a misaligned wheel thereon, apply a non-zero steering wheel angle to a steering wheel of the vehicle to maintain the vehicle moving straight with respect to a longitudinal axis of the vehicle with the misaligned wheel, measure a value of the non-zero steering wheel angle that maintains the vehicle moving straight, determine a misalignment angle of the misaligned wheel from the value of the non-zero steering wheel angle, determine a reduced travel range for the first axle from a first nominal travel range of the first axle and the misalignment angle, wherein the reduced travel range allows for a movement of the misaligned wheel without contacting the vehicle, and activate the first steering system to steer the vehicle by limiting the movement of the first axle using the reduced travel range.

In addition to one or more of the features described herein, the processor is further configured to activate the first steering system to steer the first axle by limiting the movement of the first axle using the first nominal travel range when the misaligned wheel does not make contact with the vehicle at any location of the first axle within the first nominal travel range.

In addition to one or more of the features described herein, the processor is further configured to determine an extended travel range for a second axle of the vehicle based on the misalignment angle of the misaligned wheel on the first axle and activate a second steering system to limit the movement of the second axle using the extended travel range, wherein the extended travel range is greater than a second nominal travel range of the second axle.

In addition to one or more of the features described herein, the processor is further configured to limit the movement of the first axle using the reduced travel range and limit the movement of the second axle using the extended travel range to allow the vehicle to achieve a desired turning radius.

In addition to one or more of the features described herein, one of the first axle is a front axle of the vehicle and the second axle is a rear axle of the vehicle and the first axle is the rear axle of the vehicle and the second axle is the front axle.

In addition to one or more of the features described herein, applying the non-zero steering wheel angle to maintain the vehicle moving straight further includes applying the steering wheel angle only at the front axle of the vehicle with the rear axle in a neutral position.

In addition to one or more of the features described herein, the processor is further configured to determine the misalignment angle based on the non-zero steering wheel angle that maintains the vehicle moving straight and a multiplicative constant dependent on whether the first axle is a front axle or a rear axle.

In yet another exemplary embodiment, a vehicle is disclosed. The vehicle includes a first steering system for a first axle of the vehicle, a second steering system for a second axle of the vehicle, and a processor. The processor is configured to determine the first axle to have a misaligned wheel thereon, apply a non-zero steering wheel angle to a steering wheel of the vehicle to maintain the vehicle moving straight with respect to a longitudinal axis of the vehicle with the misaligned wheel, measure a value of the non-zero steering wheel angle that maintains the vehicle moving straight, determine a misalignment angle of the misaligned wheel from the value of the non-zero steering wheel angle, determine a reduced travel range for the first axle from a first nominal travel range of the first axle and the misalignment angle, wherein the reduced travel range allows for movement of the misaligned wheel without contacting the vehicle, determine an extended travel range for the second axle based on the misalignment angle of the misaligned wheel on the first axle, wherein the extended travel range is greater than a second nominal travel range of the second axle, activate the first steering system to steer the vehicle by limiting the movement of the first axle using the reduced travel range, and activate the second steering system to steer the vehicle by limiting the movement of the second axle using the extended travel range.

In addition to one or more of the features described herein, the processor is further configured to activate the first steering system to steer the first axle by limiting the movement of the first axle using the first nominal travel range when the misaligned wheel does not make contact with the vehicle at any location of the first axle within the first nominal travel range.

In addition to one or more of the features described herein, the processor is further configured to limit the movement of the first axle using the reduced travel range and limit the movement of the second axle using the extended travel range to allow the vehicle to achieve a desired turning radius.

In addition to one or more of the features described herein, one of the first axle is a front axle of the vehicle and the second axle is a rear axle of the vehicle and the first axle is the rear axle of the vehicle and the second axle is the front axle.

In addition to one or more of the features described herein, applying the non-zero steering wheel angle to maintain the vehicle moving straight further includes applying the steering wheel angle only at the front axle of the vehicle with the rear axle in a neutral position.

In addition to one or more of the features described herein, the processor is further configured to determine the misalignment angle based on the non-zero steering wheel angle that maintains the vehicle moving straight and a multiplicative constant dependent on whether the first axle is a front axle or a rear axle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
FIG. 1 shows a vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 100. The vehicle 100 can be a car, a truck, a van, a bus, a motorcycle, a boat, or any other type of automobile. According to an embodiment, the vehicle 100 includes an internal combustion engine fueled by gasoline, diesel, or the like. According to another embodiment, the vehicle 100 is a hybrid electric vehicle partially or wholly powered by electrical power. According to another embodiment, the vehicle 100 is an electric vehicle powered by electrical power. According to one or more embodiments, the vehicle 100 is an autonomous or semi-autonomous vehicle. An autonomous vehicle is a vehicle that has self-driving capabilities. A semi-autonomous vehicle is a vehicle that has certain autonomous features (e.g., self-parking, lane keeping, etc.) but lacks full autonomous control.

The vehicle includes vehicle sensors 102 for detecting various parameters of the vehicle and a controller 104 for determining front or rear wheel misalignment based on data received from the vehicle sensors and for performing a compensating action to mitigate the effects of the misalignment. As described herein, the term "misalignment" refers to the incorrect positioning of one or more wheels of a vehicle relative to the other wheels of the vehicle. Proper wheel alignment ensures that the vehicle drives straight and true, maximizing tire life and ensuring optimal handling and ride quality/comfort.

The controller 104 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 104 may include a non-transitory computer-readable medium that stores instructions which, when processed by one or more processors of the controller 104, implement a method of controlling a road wheel angle of a misaligned wheel to prevent contact with the vehicle, according to one or more embodiments detailed herein.

The controller 104 operates a misalignment detection engine 110 which can monitor alignment observer excitation criteria (e.g., lateral acceleration equal to zero with non-zero steering wheel angle), calculate an expected vehicle heading, estimate an alignment error, apply statistical filters (e.g., moving average), and detect misalignment (e.g., whether misalignment exists and whether such misalignment is front misalignment or rear misalignment).

Figure 2:
FIG. 2 shows a schematic plan view of the vehicle, in an illustrative embodiment.

FIG. 2 shows a schematic plan view 200 of the vehicle 100, in an illustrative embodiment. The vehicle 100 includes a front left wheel 202, a front right wheel 204, a rear left wheel 206 and a rear right wheel 208. The front left wheel 202 and the front right wheel 204 are connected by a front steering system on the front axle 210. The rear left wheel 206 and the rear right wheel 208 are connected by a rear steering system on the rear axle 218. In various embodiments, the front steering system can be a first steering system and the rear steering system can be a second steering system. In other embodiments, the rear steering system is the first steering system and the front steering system is the second steering system. The front axle 210 can include a front steering rack 212 that moves along a direction from right to left of the vehicle 100 to cause the front left wheel 202 and the front right wheel 204 to rotate through a road wheel angle (RWA) with respect to a center line (i.e., longitudinal axis) of the vehicle. The front travel range 214 indicates a nominal travel range of the front steering rack 212 that is related to a nominal angular range for the front wheels, with the limits of the front travel range corresponding to angular limits to the nominal angular range. An electric power steering (EPS 216) is coupled to the front axle 210 and controls the motion of the front axle 210 and/or front steering rack 212, thereby controlling the road wheel angle for the front left wheel 202 and the front right wheel 204.

Similarly, the rear axle 218 can include a rear steering rack 220 that moves along a direction from right to left of the vehicle 100 to cause the rear left wheel 206 and the rear right wheel 208 to rotate through a road wheel angle with respect to the centerline. The rear travel range 222 indicates a nominal travel range of the rear steering rack 220 that is related to a nominal angular range for the rear wheels, with the limits of the rear travel range corresponding to angular limits to the nominal angular range. An Active Rear Steering system (ARS 224) can be coupled to the rear axle 218 and controls the motion of the rear axle and/or rear steering rack 220, thereby controlling a road wheel angle for the rear left wheel 206 and the rear right wheel 208.

A steering wheel 226 provides steering commands to the controller 104 which controls the EPS 216 and the ARS 224 to control, respectively, movement of the front axle 210 and front steering wheels and movement of the rear axle 218 and rear steering wheels. A steering angle sensor (SAS 228) measures a rotation of the steering wheel 226 and outputs a steering wheel angle (SWA) to the controller 104. The controller 104 determines steering control command for the EPS 216 and the ARS 224 using the SWA.

Each wheel is rotatable within a corresponding wheel cavity. The front left wheel 202 is selected for illustrative purposes and rotates within right front wheel cavity 230. The travel range of the corresponding steering rack (i.e., front travel range 214) corresponds to an angular range 232 for the RWA of the front left wheel 202. For a properly aligned wheel, the angular range 232 of the wheel is selected so that the wheel does not make contact with the vehicle or the interior wall 234 of the wheel cavity or any other component of the vehicle during any possible steering maneuver. A misalignment of the wheel can cause the misaligned wheel to extend beyond this angular range and make contact with the vehicle. The method disclosed herein prevents the occurrence of wheel contact.

The nominal travel ranges of the front axle and the rear axle, as well as their limits can be software-defined values and can be reprogrammed to any selected value. Thus, the angular ranges of each wheel can be controlled by setting suitable angular limits (i.e., travel ranges of the corresponding axle).

Figure 3:
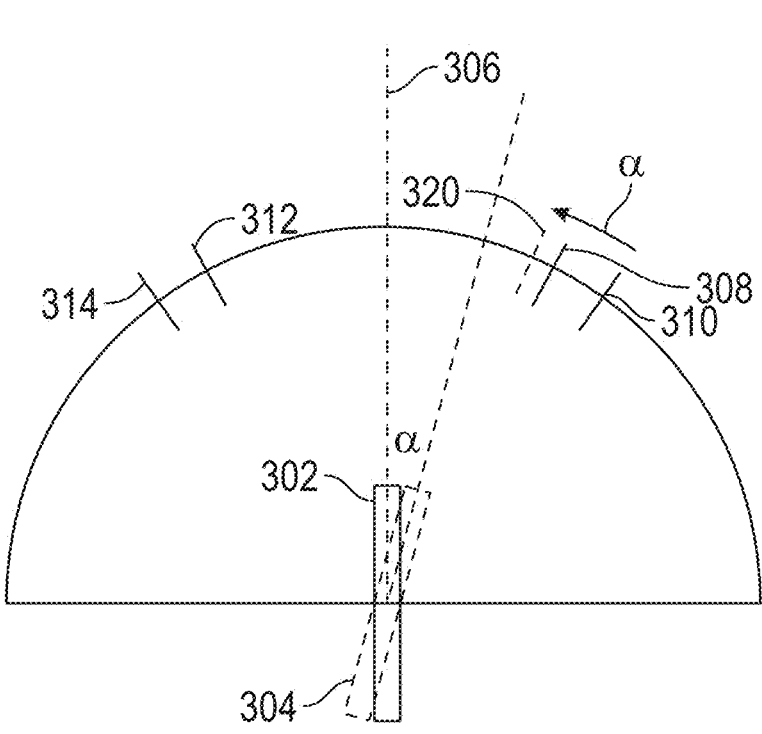
FIG. 3 is a diagram illustrating an angular range of motion for a properly aligned wheel of the vehicle.

FIG. 3 is a diagram 300 illustrating an angular range of motion for a properly aligned wheel, for illustrative purposes. A properly aligned wheel 302 and a misaligned wheel 304 are shown. The misaligned wheel is off center by misalignment angle $\alpha$. When the corresponding axle is centered, the properly aligned wheel 302 is aligned straight ahead as indicated at the center marker 306 (RWA=0). The nominal angular range indicates an angular range of motion that is generally allowed from the wheel and which keeps the wheel from contacting the vehicle. The nominal angular range for a wheel is limited by a left nominal RWA limit and a right nominal RWA limit. The right nominal RWA limit 308 ($RWA_{nomR}$) indicates a maximum angle (to the right) allowed by the corresponding axle for the properly aligned wheel 302. The left nominal limit 312 ($RWA_{nomL}$) indicates a maximum steering wheel angle (to the left) allowed by the corresponding axle for the properly aligned wheel 302. A right contact limit 310 ($RWA_{contactR}$) indicates an angle (to the right) at which the properly aligned wheel 302 makes physical contact with the vehicle. A left contact limit 314 ($RWA_{contactL}$) indicates an angle (to the left) at which the properly aligned wheel 302 makes physical contact with the vehicle.

The angle at which the misaligned wheel 304 makes contact with the vehicle is adjusted by the same misalignment angle $\alpha$. Due to this adjustment, the adjusted contact limit 320 for the misaligned wheel 304 is shown to be within the right nominal RWA limit 308 ($RWA_{nomR}$). Thus, contact is possible on a right turn, even if the steering is within the nominal range. The methods disclosed herein perform adjustments to prevent such contact by the misaligned wheel 304.

In various embodiments, the methods disclosed herein determine an angle of misalignment of a wheel on a first axle, which can be either a front axle or a rear axle (whereas a second axle is the other of the front axle or the rear axle). The first axle has a first nominal travel range and the second axle has a second nominal travel range. The first nominal travel range can be reduced to a reduced travel range and the second nominal travel range can be extended to an extended travel range. The vehicle can be steered using limits for the reduced travel range on the first axle to prevent the misaligned wheel from making contact with the vehicle. If needed, the vehicle can be steered using limits for the extended travel range on the second axle. Using the adjusted steering ranges (i.e., reduced travel range on the first axle and extended travel range on the second axle) to define the angular range of motion of the respective wheels helps the vehicle achieve a desired turning radius without having a misaligned wheel contact the vehicle.

Figure 4:
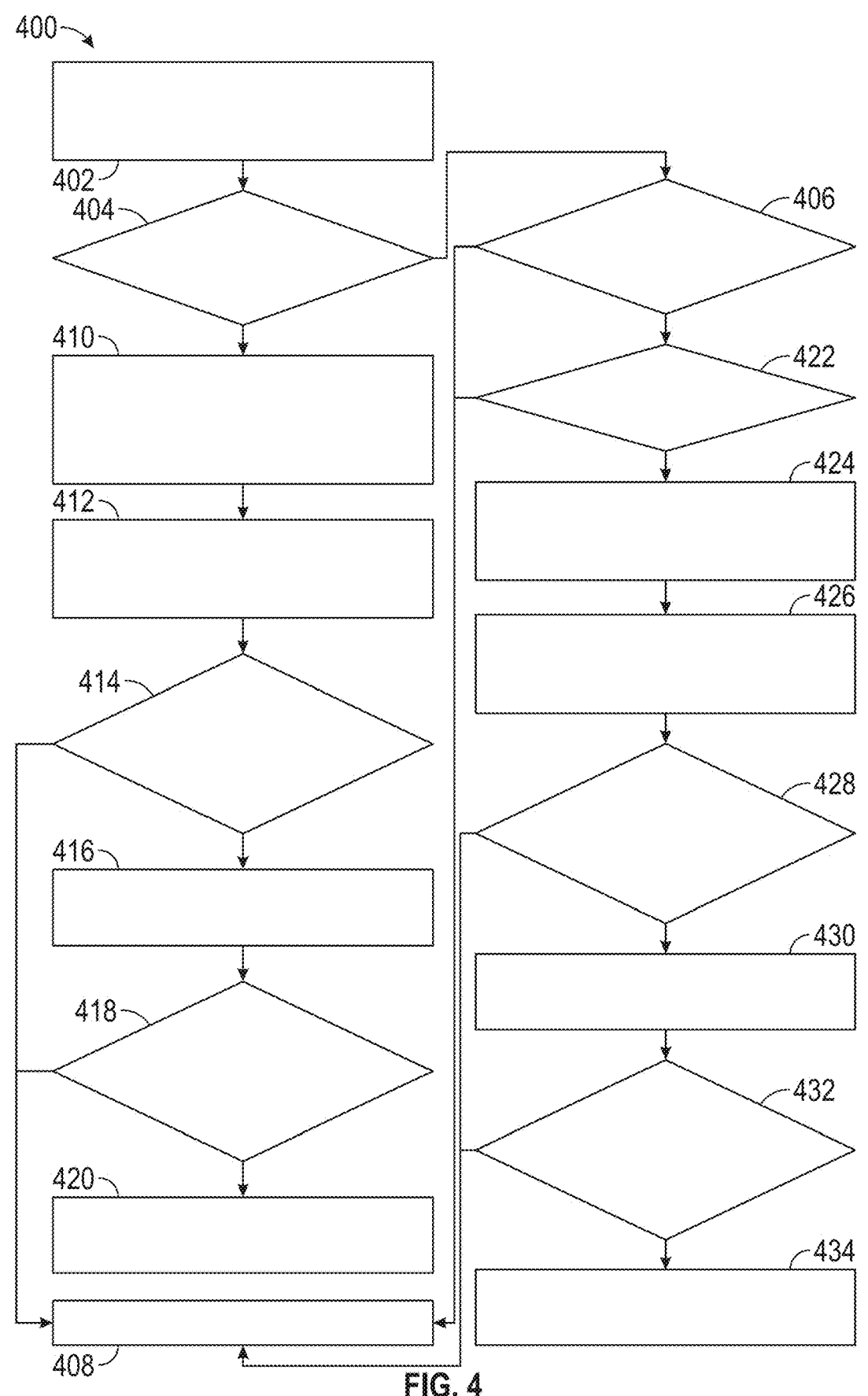
FIG. 4 is a flowchart of a method for steering the vehicle when a wheel of the vehicle is misaligned.

FIG. 4 is a flowchart 400 of a method for steering a vehicle when a wheel of the vehicle is misaligned. In box 402, a method is performed using sensors on the vehicle to detect whether a misaligned wheel is present on the vehicle. In box 404, a decision is made based on whether a misaligned wheel is located on the front axle. If a misaligned wheel is determined to be on the front axle, the method proceeds to box 410. Otherwise, the method proceeds to box 406. In box 406, a decision is made based on whether a misaligned wheel is on the rear axle. If the misaligned wheel is on the rear axle, the method proceeds to box 422. Otherwise, the method proceeds to box 408. In box 408, no action is taken with respect to the misaligned wheel. Boxes 410-420 describe actions taken for the misaligned wheel on the front axle. Boxes 422-434 describe actions taken when the misaligned wheel is on the rear axle.

Referring first to boxes 410-420, in box 410, the vehicle is driven in a straight line and a steering wheel angle (SWA) B is measured that allows the vehicle to remain moving along the straight line. If the vehicle has ARS 224, the ARS is held in a neutral position to allow the rear steering rack to be centered. If the vehicle does not have ARS 224, the rear wheels are naturally in the neutral position. The SWA command is used to control the steering of only the front wheels by holding the ARS 224 in the neutral position.

In box 412, a front wheel misalignment angle (afront) due to the misaligned wheel is calculated. The front wheel misalignment angle is calculated based on the steering wheel angle β employed to enforce driving the vehicle in a straight line. The front wheel misalignment angle (afront) can be calculated as shown in Eq. (1):

$$\alpha_{front} = \frac{(\beta)(m.c.)}{(\text{front steer ratio})} \qquad \text{Eq. (1)}$$

where m.c. is a multiplicative constant that is always equal to 2 for the front steering system and front steer ratio relates the steering wheel angle to the front road wheel angle. Box 414 is a decision box in which it is determined if the front wheel angle is enough to cause the misaligned wheel to contact the vehicle or with vehicle components-when the front steering rack is at the end of the front travel range 214.

A maximum front RWA for the misaligned wheel (Max_Front_RWA$_{misalign}$) is calculated by adding the misalignment angle α to the nominal angular RWA limit, as shown in Eq. (2):

$$\text{Max\_Front\_RWA}_{misalign} = \text{front } RWA_{nom} + \alpha_{front} \qquad \text{Eq. (2)}$$

The maximum front RWA for the misaligned wheel can be compared to a front wheel contact limit to determine whether an action is needed. If no potential contact is determined (i.e., Max_Front_RWA$_{misalign}$<Front RWA$_{contact}$, the method proceeds to box 408. In box 408, the method ends with no adjustments made to the travel ranges. Returning to box 414, if it is determined that the misaligned wheel can contact the vehicle (i.e., Max_Front_RWA$_{misalign}$>Front RWA$_{contact}$), the travel ranges need to be adjusted, and thus the method proceeds to box 416.

In box 416, the front travel range 214 is adjusted to reduce the possibility of the misaligned wheel making contact. A reduced front travel range is calculated from the front nominal angular range for the front wheels, as shown in Eq. (3):

$$\text{front reduced travel range} = \pm(\text{front } RWA_{nom} - \alpha_{front})* \\ ((\beta/360)*(C\_\text{factor})) \qquad \text{Eq. (3)}$$

where C-factor is the ratio of the front steering rack displacement (in millimeters) per one revolution of the steering wheel.

The front reduced travel range indicates the farther to the left or to the right that the front steering rack can move under the reduced range conditions. Box 418 is a decision box in which it is determined if the ARS 224 has additional rack travel capability, or the ability to change travel limits at the rear axle 218. If the ARS 224 does not have additional rear rack travel capability, the method proceeds to box 408, in which the method ends with no further travel range adjustment. Returning to box 418, if the ARS 224 has additional rear rack travel capability, the method proceeds to box 420.

In box 420, the travel range of the rear axle is extended from its nominal rear travel range to create an extended rear travel range. The extended rear travel range of the rear axle can be calculated as shown in Eq. (4):

$$\text{extended rear axle limit} = (\text{Rear } RWA_{nom} + \alpha_{front})* \\ (\text{travel ratio}) \qquad \text{Eq. (4)}$$

where the travel ratio is the ratio between the rear steering rack travel (in millimeters) and the rear road wheel angle (in degrees).

Turning now to boxes 422-434, in box 422 (i.e., rear wheel misalignment is detected), it is determined whether the vehicle is equipped with ARS 224. If the vehicle is not equipped with ARS 224, the method proceeds to box 408, in which the method ends with no travel range adjustment. Otherwise (i.e., the vehicle is equipped with ARS 224), the method proceeds to box 424. In box 424, the vehicle is driven in a straight line and a steering wheel angle (SWA) β is measured that allows the vehicle to remain moving along the straight line. The ARS 224 system is held in a neutral position to allow the (properly aligned) rear wheel to be pointed straight ahead. The SWA controls the steering of only the front wheels via the EPS 216 while the ARS 224 is held in the neutral position (i.e., rear steering rack is centered).

In box 426, a rear wheel misalignment angle ($\alpha_{rear}$) is calculated for the misaligned wheel. The rear wheel misalignment angle is calculated based on the SWA (β) for driving the vehicle in a straight line. Once the SWA (β) for driving in a straight line with a misaligned tire on the rear axle is known, the rear misalignment ($\alpha_{rear}$) is calculated as shown in Eq. (5):

$$\alpha_{rear} = \frac{\beta}{(\text{front steer ratio})} \qquad \text{Eq. (5)}$$

Eq. (5) is similar to Eq. (1), where the multiplicative constant is now equal to 1. The maximum rear RWA limit for the misaligned wheel is given by adding the misalignment angle $\alpha_{rear}$ to the nominal rear axle limit, as shown in Eq. (2):

$$\text{Max\_Rear\_RWA}_{misalign} = \text{rear } RWA_{nom} + \alpha_{rear} \qquad \text{Eq. (6)}$$

Box 428 is a decision box in which it is determined if the rear wheel misalignment angle is enough to cause the misaligned wheel to contact the vehicle or with vehicle components when the rear steering rack is at the end of the rear travel range 222. The maximum rear misalignment angle can be compared to the rear wheel contact limit to determine whether travel ranges need to be adjusted.

If no potential contact is determined (i.e., Max_Rear_RWA$_{misalign}$<Rear RWA$_{contact}$, the method proceeds to box 408. In box 408, the method ends with no adjustments to travel ranges. Returning to box 428, if it is determined that the misaligned wheel can contact the vehicle (i.e., Max_Rear_RWA$_{misalign}$ RWA$_{contact}$), the travel ranges need to be adjusted, and thus the method proceeds to box 430.

In box 430, the rear travel range is adjusted to reduce the possibility of the misaligned wheel making contact. A reduced rear steering rack travel limit is determined for the rear axle 218.

The rear travel range of the rear axle can be reduced from a nominal rear travel range. The reduced rear travel range corrects for the misalignment angle of the misaligned wheel, as shown in Eq. (3):

$$\text{reduced rear travel limit} = (\text{rear } RWA_{nom} - \alpha_{rear})^* \text{(travel ratio)} \qquad \text{Eq. (7)}$$

The reduced rear travel limit indicates the farthest to the left or to the right that the rear steering rack can move under the reduced range conditions. Box 432 is a decision box in which it is determined if the EPS 216 has additional rack travel capability, or the ability to change travel limits at the front axle 210. If no additional front steering rack travel capability is available, the method proceeds to box 408, in which the method ends with no further range adjustments. Returning to box 432, if additional rack travel capacity is available at the front axle 210, the method proceeds to box 434.

In box 434, an extended ARS rack travel is enabled to expand the travel limits of the front axle. The front axle is then capable of moving through a range defined by the extended front axle travel limit, which is calculated as shown in Eq. (5):

$$\text{Extended front limit} = (\text{Front } RWA_{nom} + \alpha_{rear})^* ((B/360)^* (C\_factor)) \qquad \text{Eq. (8)}$$

When motion of the rear axle 218 (and the ARS 224) is limited to a reduced travel range to accommodate a misaligned rear wheel a desired turning radius of the vehicle is difficult to achieve for sufficiently wide turns. Therefore, the extended travel range can then be applied to the front axle 210 to allow the desired turning radius to be achieved.

Figure 5:
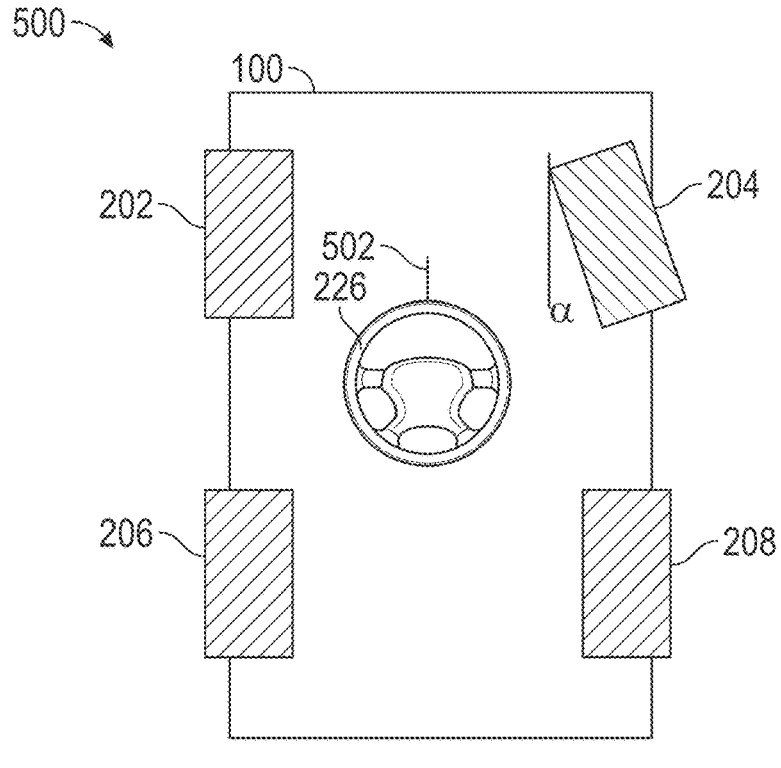
FIG. 5 is a diagram of the vehicle in a straight-ahead driving configuration with three properly aligned wheels and a misaligned wheel on the front axle.

FIGS. 5-9 are diagrams illustrating the method of steering disclosed in boxes 410-420 of FIG. 4. Each diagram shows a plan view of the vehicle and relative orientations of wheels of the vehicle (front left wheel 202, front right wheel 204, rear left wheel 206 and rear right wheel 208) as well as the steering wheel 226. A steering angle indicator 502 shows the relative angle of the steering wheel 226. FIG. 5 is a diagram 500 of the vehicle 100 in a straight-ahead driving configuration with three properly aligned wheels and a misaligned wheel (e.g., front right wheel 204). The steering wheel angle is at zero (SWA=0) as indicated by the steering angle indicator 502 pointing straight ahead.

Figure 6:
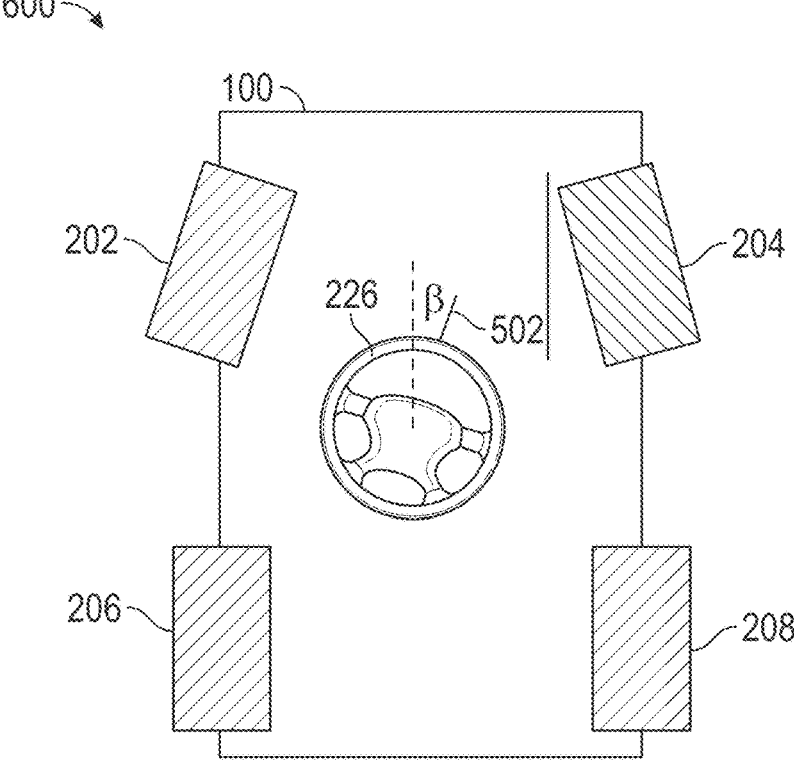
FIG. 6 is a diagram of the vehicle during a test to determine a misalignment angle of the misaligned wheel on the front axle.

FIG. 6 is a diagram 600 of the vehicle 100 during a test to determine the mis-alignment angle of the mis-aligned wheel. The steering wheel is turned (to the right) to move the front axle such that the front road wheel angle (front RWA) for the front left wheel 202 is equal and opposite to the road wheel angle made by the front right wheel 204. In this configuration, the lateral forces caused by the each of the front left wheel 202 and the front right wheel 204 are equal and opposite and therefore cancel each other. As a result, the vehicle 100 travels in a straight line. The steering wheel angle SWA at which the vehicle travels in a straight line (i.e., angle β) is then recorded.

Figure 7:
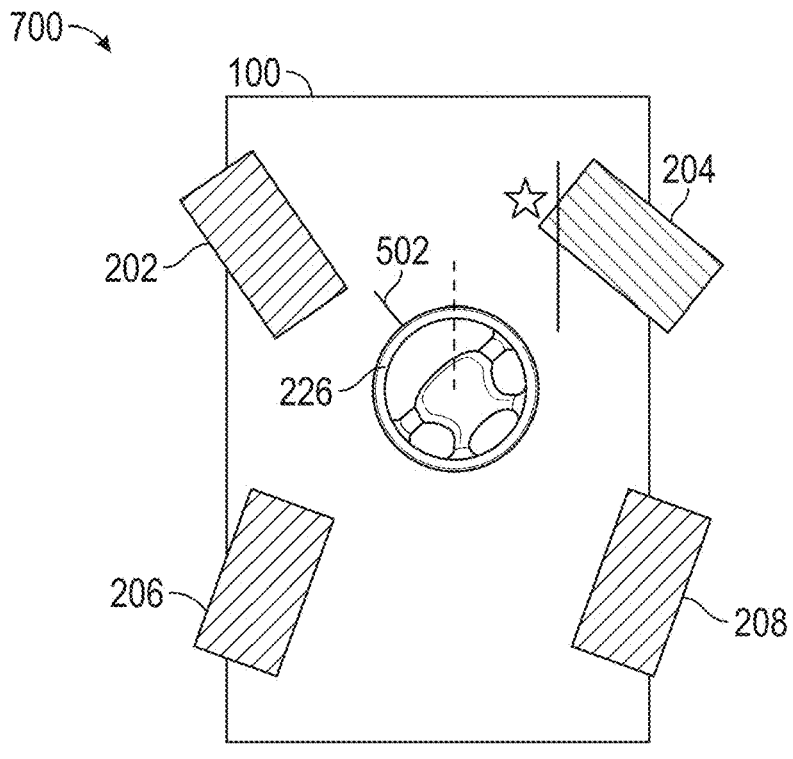
FIG. 7 is a diagram of the vehicle illustrating a consequence of the misaligned wheel on the front axle during a turn.

FIG. 7 is a diagram 700 of the vehicle 100 illustrating the consequence of the mis-aligned wheel during a turn. The steering wheel 226 has been turned to the left to perform a vehicle turn. The front axle is at the limit of the front travel range and the rear axle is at the limit of the rear travel range. Due to the misalignment, the front right wheel 204 extends past the contact limit and makes contact with the vehicle.

Figure 8:
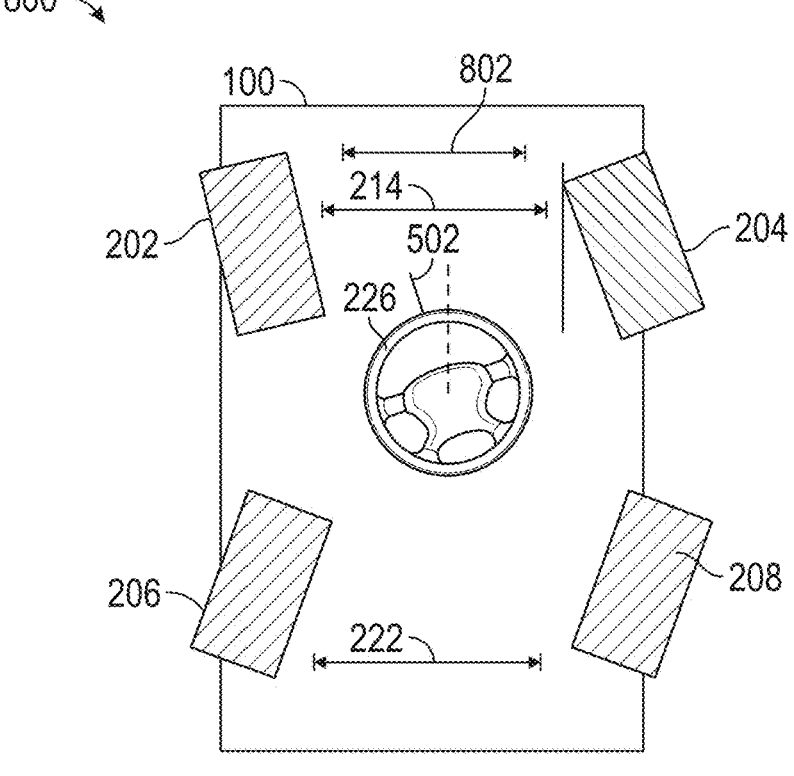
FIG. 8 is a diagram of the vehicle illustrating a steering operation using a reduced front travel range.

FIG. 8 is a diagram 800 of the vehicle illustrating a steering operation using a reduced front travel range. The front travel range 214 is reduced to a reduced front travel range 802. In other words, the limits of the reduced front travel range 802 are applied during a steering operation at the front axle. As shown, the front wheels are turned at the limit of the reduced front travel range 802, and the rear wheels are shown at the limit of the rear travel range 222 (i.e., nominal rear travel range). The amount of compensation provided by the rear wheels (as limited by the rear travel range 222) may or may not be enough to aid in achieving the desired turning radius for wide turns.

Figure 9:
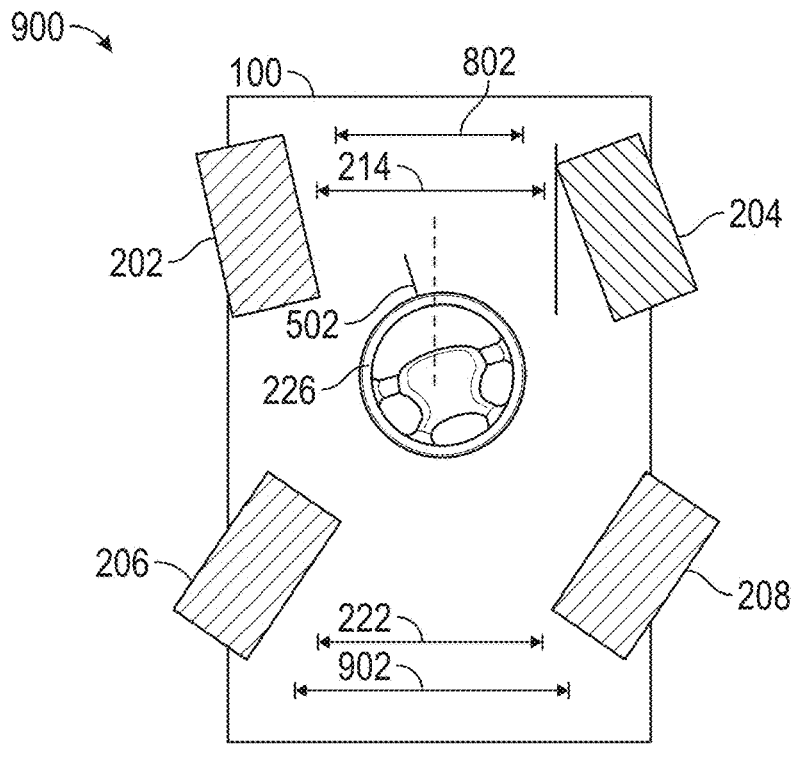
FIG. 9 is a diagram of the vehicle illustrating a steering operation using a reduced front travel range and an extended rear travel range.

FIG. 9 is a diagram 900 of the vehicle 100 illustrating a steering operation using a reduced front travel range 802 and an extended rear travel range 902. The limits of the extended rear travel range 902 are applied during a steering operation at the rear axle. The front axle is at the limit of the reduced front travel range 802 and the rear axle is at the limit of the extended rear travel range 902. The additional angular steering provided by the rear axle helps achieve a desired turning radius for the vehicle for wide turns without the misaligned wheel contacting the vehicle.

Figure 10:
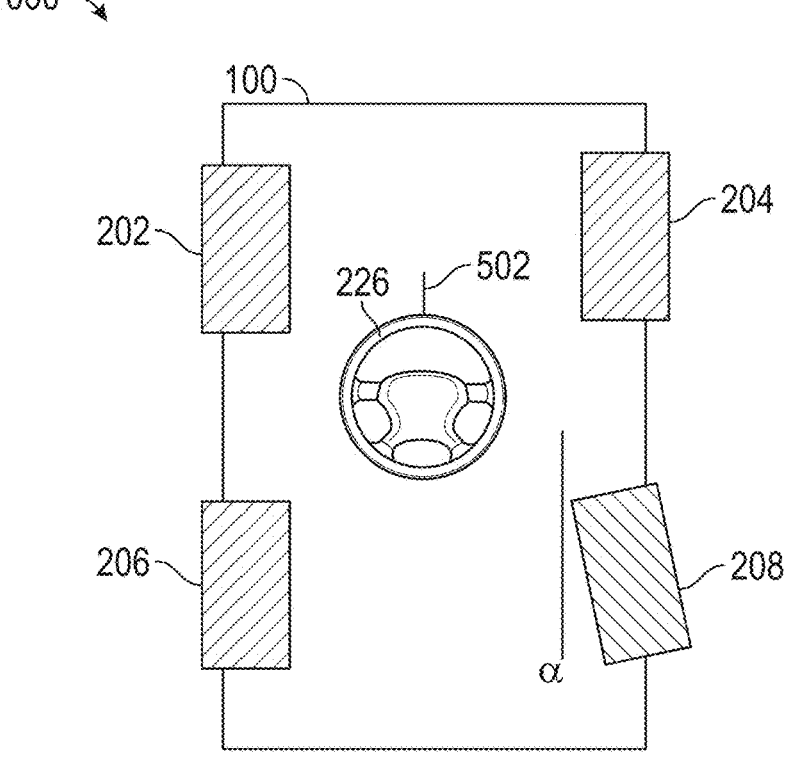
FIG. 10 is a diagram of the vehicle in a straight-ahead driving configuration with three properly aligned wheels and a misaligned wheel on a rear axle.

FIGS. 10-15 are diagrams illustrating the method of steering disclosed in boxes 422-434 of FIG. 4, in an illustrative embodiment. Each diagram shows a plan view of the vehicle 100 and relative orientations of wheels of the vehicle (front left wheel 202, front right wheel 204, rear left wheel 206 and rear right wheel 208) as well as the steering wheel 226. A steering angle indicator 502 shows the relative angle of the steering wheel 226. FIG. 10 is a diagram 1000 of the vehicle 100 in a straight-ahead driving configuration with three properly aligned wheels and a misaligned wheel (e.g., rear right wheel 208). The steering wheel angle is at zero (SWA=0) as indicated by the steering angle indicator 502 pointing straight ahead.

Figure 11:
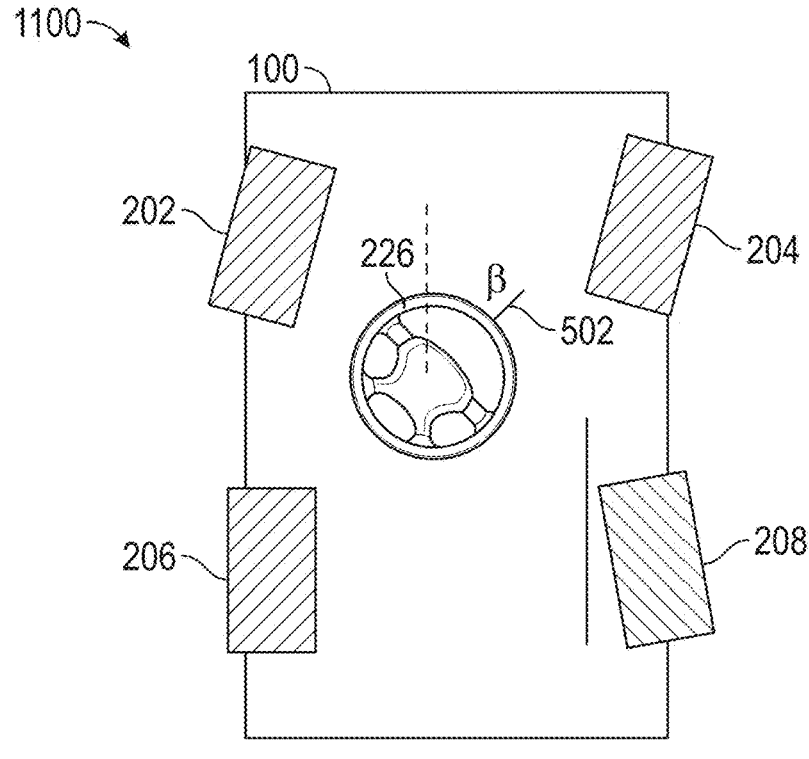
FIG. 11 is a diagram of the vehicle during a test to determine the misalignment angle of the misaligned wheel on the rear axle.

FIG. 11 is a diagram 1100 of the vehicle 100 during a test to determine the mis-alignment angle of the mis-aligned wheel. The steering wheel is turned (to the right) to move the front axle such that the front road wheel angle (front RWA) for the front wheels compensate for the misaligned rear wheel, thereby resulting in the vehicle 100 traveling in a straight line. The steering wheel angle SWA at which the vehicle travels in a straight line (i.e., angle β) is then recorded.

Figure 12:
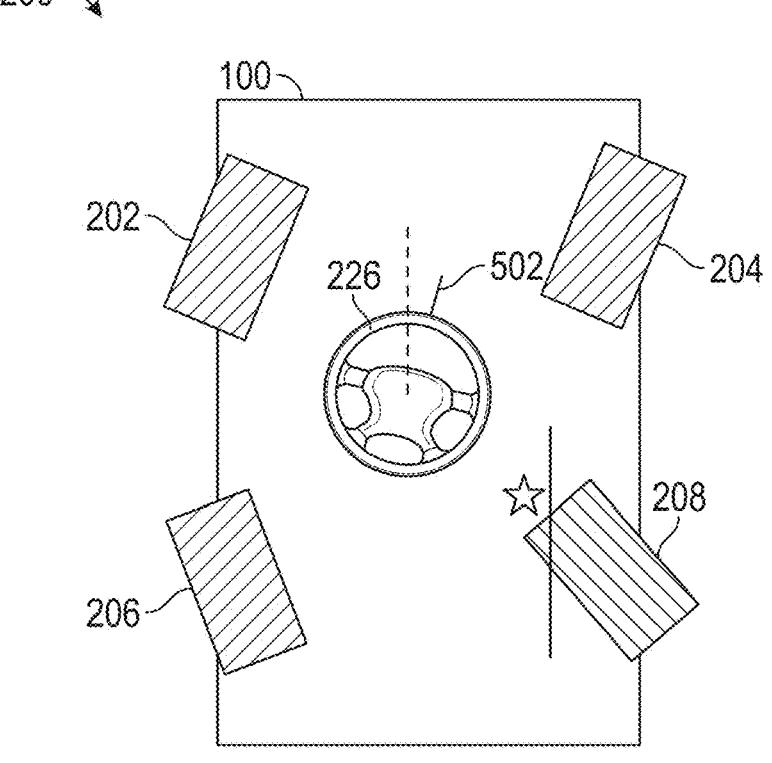
FIG. 12 is a diagram of the vehicle illustrating the consequence of the misaligned rear wheel on the rear axle during a turn.

FIG. 12 is a diagram 1200 of the vehicle 100 illustrating the consequence of the mis-aligned rear wheel during a turn. The steering wheel 226 has been turned to the right to perform a vehicle turn. The rear steering rack 220 is at the limit of the rear travel range and the front steering rack is at the limit of the front travel range. Due to the misalignment, the rear right wheel 208 extends past the nominal contact limit and therefore contacts the vehicle.

Figure 13:
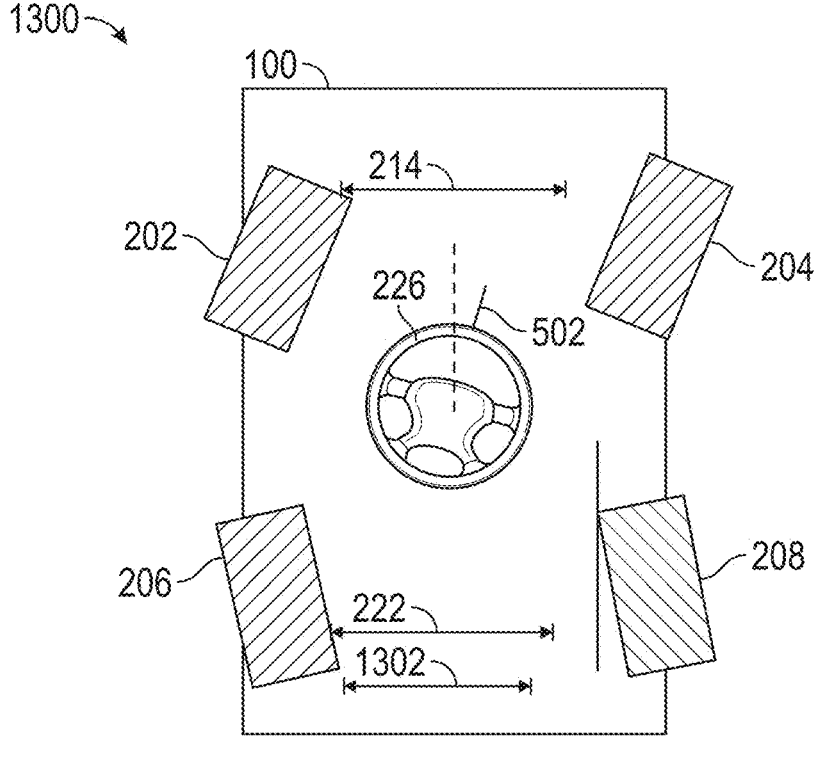
FIG. 13 is a diagram of the vehicle illustrating a steering operation using a reduced rear travel range.

FIG. 13 is a diagram 1300 of the vehicle illustrating a steering operation using a reduced rear travel range 1302. The rear travel range 222 is reduced to the reduced rear travel range 1302. In other words, the limits of the reduced rear travel range 1302 are applied during a steering operation at the rear axle. As shown, the rear wheels are turned at the limit of the reduced rear travel range 1302. The front wheels are shown at the limit of the front travel range 214. The amount of compensation provided by the front wheels may or may not be enough to aid in achieving a desired turning radius for wide turns.

Figure 14:
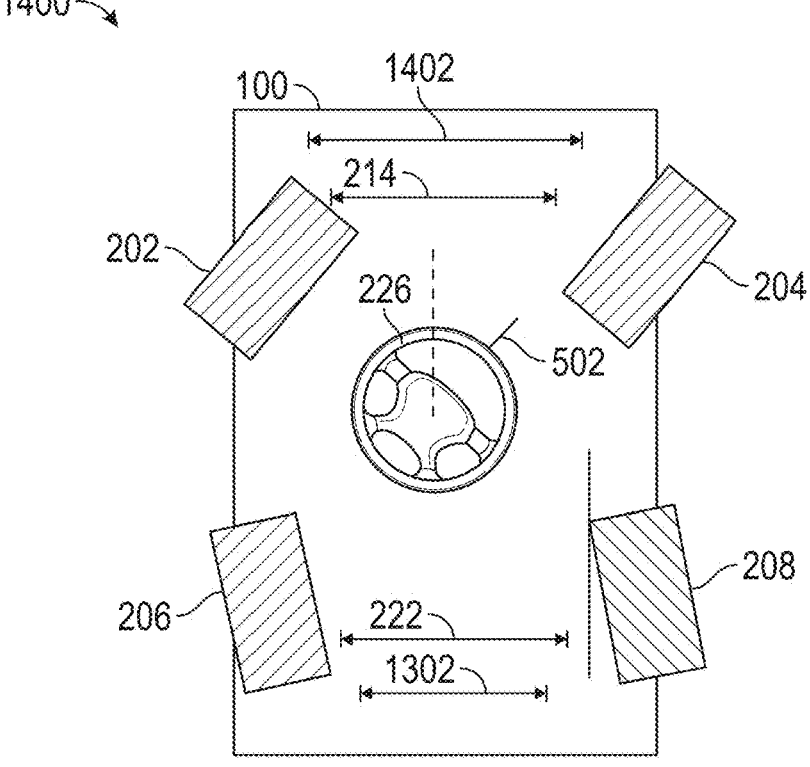
FIG. 14 is a diagram of the vehicle illustrating a steering operation using a reduced rear travel range and an extended front travel range.

FIG. 14 is a diagram 1400 of the vehicle 100 illustrating a steering operation using a reduced rear travel range 1302 and an extended front travel range 1402. The limits of the extended front travel range 1402 are applied during a steering operation at the front axle. The rear axle is at the limit of the reduced rear travel range 1302 and the front axle is at the limit of the extended front travel range 1402. The additional angular steering provided by the front axle helps the vehicle achieve the desired turning radius for wide turns without the misaligned rear wheel contacting the vehicle.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a vehicle, comprising:
   determining a first axle having a misaligned wheel thereon;
   applying a non-zero steering wheel angle to a steering wheel of the vehicle to maintain the vehicle moving straight with respect to a longitudinal axis of the vehicle with the misaligned wheel;
   measuring a value of the non-zero steering wheel angle that maintains the vehicle moving straight;
   determining a misalignment angle of the misaligned wheel from the value of the non-zero steering wheel angle;
   determining a reduced travel range for the first axle from a first nominal travel range of the first axle and the misalignment angle, wherein the reduced travel range allows for a movement of the misaligned wheel without contacting the vehicle; and steering the vehicle by limiting the movement of the first axle using the reduced travel range.

2. The method of claim 1, further comprising limiting the movement of the first axle using the first nominal travel range when the misaligned wheel does not make contact with the vehicle at any location of the first axle within the first nominal travel range.

3. The method of claim 1, further comprising determining an extended travel range for a second axle of the vehicle based on the misalignment angle of the misaligned wheel on the first axle and steering the vehicle by limiting the movement of the second axle using the extended travel range, wherein the extended travel range is greater than a second nominal travel range of the second axle.

4. The method of claim 3, wherein limiting the movement of the first axle using the reduced travel range and limiting the movement of the second axle using the extended travel range allows the vehicle to achieve a desired turning radius.

5. The method of claim 3, wherein one of: (i) the first axle is a front axle of the vehicle and the second axle is a rear axle of the vehicle; and (ii) the first axle is the rear axle of the vehicle and the second axle is the front axle.

6. The method of claim 5, wherein applying the non-zero steering wheel angle to maintain the vehicle moving straight further comprising applying the steering wheel angle only at the front axle of the vehicle with the rear axle in a neutral position.

7. The method of claim 1, further comprising determining the misalignment angle based on the non-zero steering wheel angle that maintains the vehicle moving straight and a multiplicative constant dependent on whether the first axle is a front axle or a rear axle.

8. A system for operating a vehicle, comprising:
   a first steering system for a first axle of the vehicle;
   a processor configured to:
   determine the first axle to have a misaligned wheel thereon;
   apply a non-zero steering wheel angle to a steering wheel of the vehicle to maintain the vehicle moving straight with respect to a longitudinal axis of the vehicle with the misaligned wheel;
   measure a value of the non-zero steering wheel angle that maintains the vehicle moving straight;
   determine a misalignment angle of the misaligned wheel from the value of the non-zero steering wheel angle;
   determine a reduced travel range for the first axle from a first nominal travel range of the first axle and the misalignment angle, wherein the reduced travel range allows for a movement of the misaligned wheel without contacting the vehicle; and
   activate the first steering system to steer the vehicle by limiting the movement of the first axle using the reduced travel range.

9. The system of claim 8, wherein the processor is further configured to activate the first steering system to steer the first axle by limiting the movement of the first axle using the first nominal travel range when the misaligned wheel does not make contact with the vehicle at any location of the first axle within the first nominal travel range.

10. The system of claim 8, wherein the processor is further configured to determine an extended travel range for a second axle of the vehicle based on the misalignment angle of the misaligned wheel on the first axle and activate a second steering system to limit the movement of the second axle using the extended travel range, wherein the extended travel range is greater than a second nominal travel range of the second axle.

11. The system of claim 10, wherein the processor is further configured to limit the movement of the first axle using the reduced travel range and limit the movement of the second axle using the extended travel range to allow the vehicle to achieve a desired turning radius.

12. The system of claim 10, wherein one of: (i) the first axle is a front axle of the vehicle and the second axle is a rear axle of the vehicle; and (ii) the first axle is the rear axle of the vehicle and the second axle is the front axle.

13. The system of claim 12, wherein applying the non-zero steering wheel angle to maintain the vehicle moving straight further comprises applying the steering wheel angle only at the front axle of the vehicle with the rear axle in a neutral position.

14. The system of claim 8, wherein the processor is further configured to determine the misalignment angle based on the non-zero steering wheel angle that maintains the vehicle moving straight and a multiplicative constant dependent on whether the first axle is a front axle or a rear axle.

15. A vehicle, comprising:
a first steering system for a first axle of the vehicle;
a second steering system for a second axle of the vehicle;
a processor configured to:
   determine the first axle to have a misaligned wheel thereon;
   apply a non-zero steering wheel angle to a steering wheel of the vehicle to maintain the vehicle moving straight with respect to a longitudinal axis of the vehicle with the misaligned wheel;
   measure a value of the non-zero steering wheel angle that maintains the vehicle moving straight;
   determine a misalignment angle of the misaligned wheel from the value of the non-zero steering wheel angle;
   determine a reduced travel range for the first axle from a first nominal travel range of the first axle and the misalignment angle, wherein the reduced travel range allows for movement of the misaligned wheel without contacting the vehicle;
   determine an extended travel range for the second axle based on the misalignment angle of the misaligned wheel on the first axle, wherein the extended travel range is greater than a second nominal travel range of the second axle;
   activate the first steering system to steer the vehicle by limiting the movement of the first axle using the reduced travel range; and
   activate the second steering system to steer the vehicle by limiting the movement of the second axle using the extended travel range.

16. The vehicle of claim 15, wherein the processor is further configured to activate the first steering system to steer the first axle by limiting the movement of the first axle using the first nominal travel range when the misaligned wheel does not make contact with the vehicle at any location of the first axle within the first nominal travel range.

17. The vehicle of claim 16, wherein the processor is further configured to limit the movement of the first axle using the reduced travel range and limit the movement of the second axle using the extended travel range to allow the vehicle to achieve a desired turning radius.

18. The vehicle of claim 15, wherein one of: (i) the first axle is a front axle of the vehicle and the second axle is a rear axle of the vehicle; and (ii) the first axle is the rear axle of the vehicle and the second axle is the front axle.

19. The vehicle of claim 18, wherein applying the non-zero steering wheel angle to maintain the vehicle moving straight further comprises applying the steering wheel angle only at the front axle of the vehicle with the rear axle in a neutral position.

20. The vehicle of claim 15, wherein the processor is further configured to determine the misalignment angle based on the non-zero steering wheel angle that maintains the vehicle moving straight and a multiplicative constant dependent on whether the first axle is a front axle or a rear axle.

* * * * *